Sept. 22, 1931.  W. W. KNIGHT  1,824,601
INSULATING COVERING FOR FLEXIBLE PIPE CONDUITS
Filed July 9, 1928   2 Sheets-Sheet 2
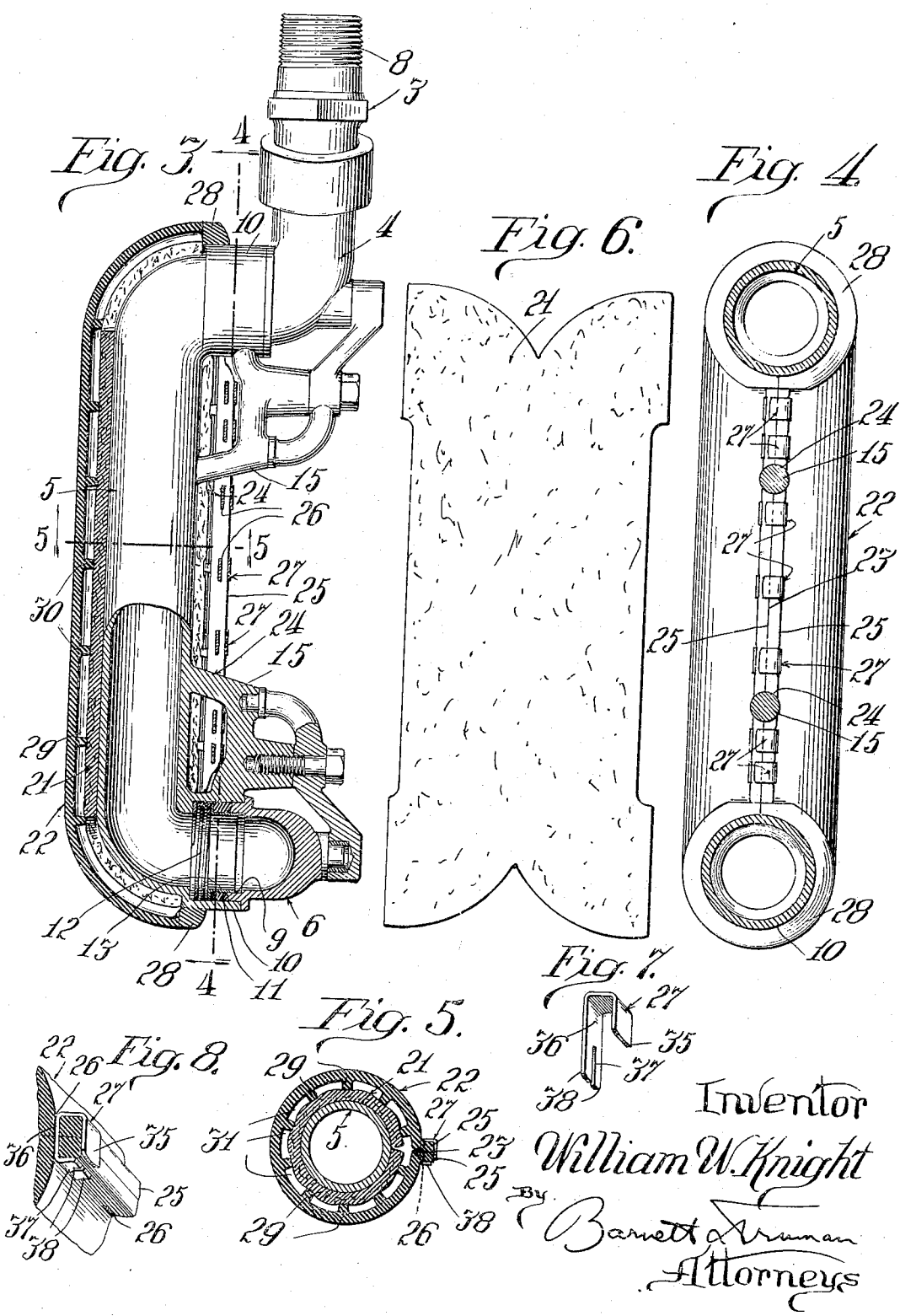
Inventor
William W. Knight
By Barnett & Truman
Attorneys Patented Sept. 22, 1931

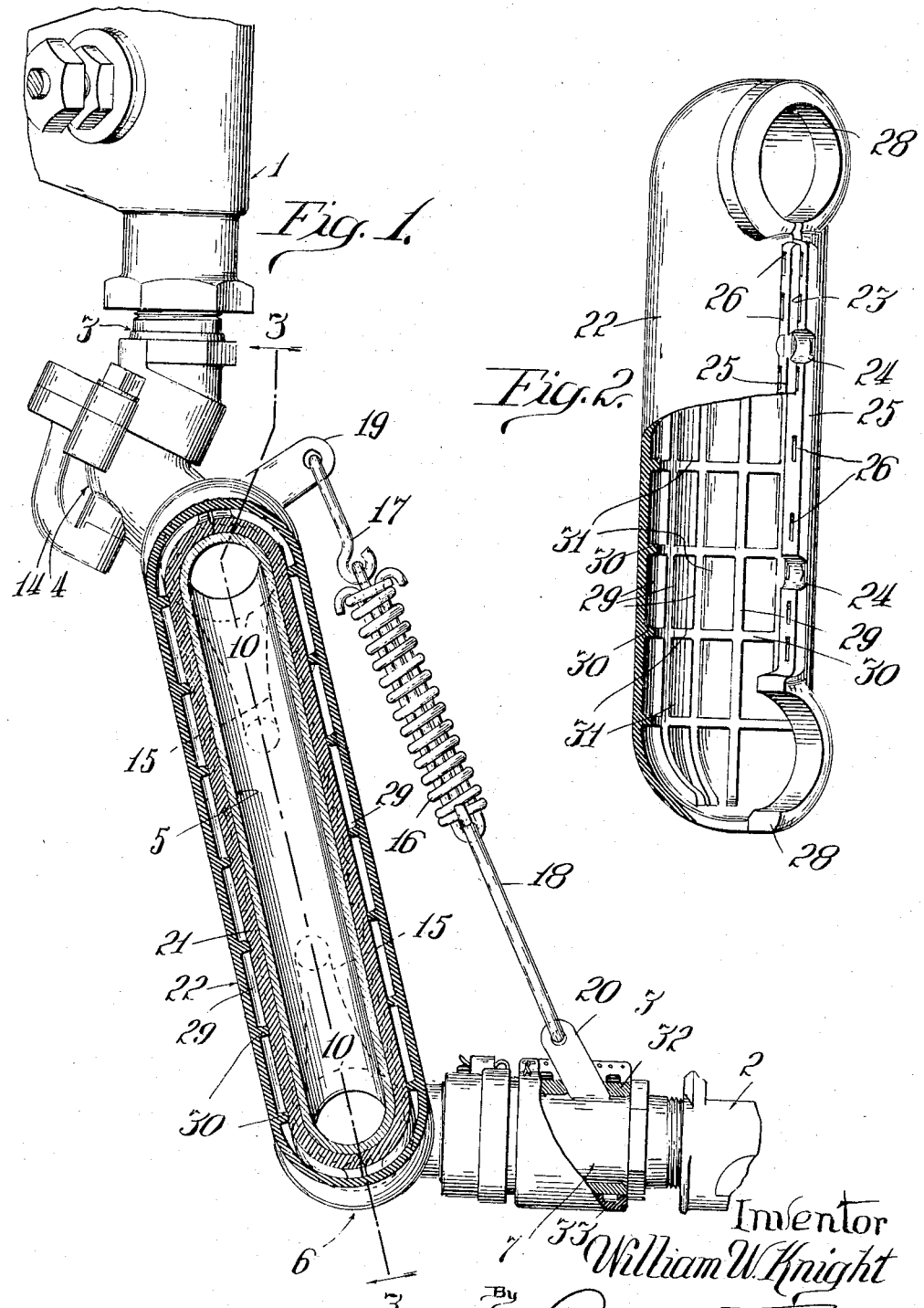

1,824,601

UNITED STATES PATENT OFFICE

WILLIAM W. KNIGHT, OF EVANSTON, ILLINOIS, ASSIGNOR TO ROTH RUBBER COMPANY, OF CHICAGO, ILLINOIS, A CORPORATION OF ILLINOIS

INSULATING COVERING FOR FLEXIBLE PIPE CONDUITS

Application filed July 9, 1928. Serial No. 291,318.

This invention relates to an insulating covering for flexible metallic conduits, and more particularly to a new and improved means for protecting and insulating a portion of a flexible metallic conduit structure.

It is possible, and customary, to insulate the stationary portions of steam pipe lines on railway cars so as to minimize the heat losses. For coupling together the steam pipes on adjacent cars, flexible metallic conduits made up of a plurality of rigid metal conduit sections suitably articulated together at their ends are now replacing the flexible rubber hose couplers formerly used. These flexible metallic conduits include sections of considerable length which should be insulated to avoid excessive heat losses. These sections have been covered with a jacket of asbestos or other fibrous insulating material, which was held in place and protected by an outer casing of thin sheet metal. This outer metal casing will "sweat" or accumulate moisture so that the insulation becomes wet and wet insulation is not effective. It is also impossible to seal this metal casing tightly, and if the metal casing contacts at any place with the inner metallic structure it serves to conduct heat from the inner conduit.

The present invention relates to a new and improved casing which surrounds the fibrous insulating jacket heretofore used. A casing of rubber, or other similar nonmetallic substance, is formed to substantially enclose the conduit member except for the outlets at the ends, and the casing is split along one side so that it may be sprung apart and placed in position about the insulating covering. The casing is formed internally with inwardly projecting crossed ribs which engage the asbestos insulation and provide air pockets between this insulation and the rubber casing, these air pockets greatly increasing the insulating properties of the covering. The rubber casing is bound securely in place about the conduit structure and asbestos insulation, and serves not only to prevent the loss of heat but as a protection for the enclosed parts since the rubber casing will absorb shocks and blows without injury to itself or the parts therein.

The object of this invention is to provide a new and improved insulating covering for a metallic conduit structure, as briefly described hereinabove and as disclosed more in detail in the description which follows.

Other objects and advantages of the invention will be more apparent from the following detailed description of one approved form of the device.

In the accompanying drawings:

Fig. 1 is a side elevation of a portion of one of the flexible metallic conduit structures with the insulation in place, portions being shown in vertical section.

Fig. 2 is an elevation, partially broken away, showing the outer casing member forming the particular subject matter of this invention before it is applied to the conduit.

Fig. 3 is a view partially in elevation and partially in section, taken substantially on the line 3—3 of Fig. 1.

Fig. 4 is a vertical section taken substantially on the line 4—4 of Fig. 3.

Fig. 5 is a transverse section, taken substantially on the line 5—5 of Fig. 3.

Fig. 6 is a plan view of the inner fibrous insulating jacket before it is applied to the conduit.

Fig. 7 is a perspective view of one of the metallic binders or clips used to secure the casing in position.

Fig. 8 is a detail perspective showing the binder in applied position.

Referring first to Figs. 1 and 3, at 1 is shown the casing of the end train pipe valve on the car which is connected with one end of the train steam pipe on the car, and 2 is one of a pair of mating coupling members adapted to be secured to a similar coupling member which is flexibly supported from the adjacent car. The coupling member 2 is supported from the valve 1, by means of a flexible conduit of some suitable type. This flexible conduit in the example here shown comprises an upper supporting member 3, an upper joint member 4, a main conduit section 5, a lower joint member 6, and a lower conduit member 7, to which latter is secured the coupling member 2. Each of the above enumerated members of the flexible conduit structure is articulated with the adjacent member of the structure by a swiveled articulation consisting of inter-fitting sleeves or cylindrical bearing elements held in operative relation without substantial endwise pressure of one member against the other, the joint between the bearing elements being sealed by a gasket which is not clamped or compressed between the members of the flexible structure but is in a sense floating and is maintained in its sealing position in part by a spring but more firmly and effectively by the pressure of the fluid passing through the conduit.

The upper supporting member 3 has a threaded extension 8 by which it is supported from the valve casing 1. One of the swiveled connections (for example that one between the lower joint member 6 and the lower end of conduit 5) is shown at the bottom of Fig. 3. The nipple 9 on joint member 6 extends into the open end of outlet 10 of conduit 5, and has a beveled end engaging the gasket 11, which gasket is urged against the end of the nipple and outwardly against the inner surface of outlet 10 by the spring 12 bearing on follower 13, and also by the steam pressure existing within the conduit. It will be understood that the other swiveled connections between the various members of this conduit are provided with similar packing connections. The upper joint member 4 is supported from the upper member 3 by means of the bracket 14.

The intermediate conduit member 5, with the insulation of which we are particularly concerned in this present instance, comprises a straight portion of considerable length provided with curved ends leading to the outlets 10 which open at right angles to the main straight portion of the conduit. Brackets 15 extend laterally from the inner side of conduit 5, substantially in the plane of the centers of outlet 10, these brackets 15 being adapted to support the conduit 5 from the upper joint member 4, and to support the lower joint member 6 from the conduit 5. A flexible sustaining device comprising the spring 16, and links 17 and 18, connects the lug 19 on upper joint member 4 with the lug 20 on lower conduit member 7, thus serving to yieldably support the flexible conduit structure when not connected with the conduit on an adjacent car.

The long central conduit member 5 has the greatest exposed area of any member of the coupling, and it is with the insulation of this member that we are here particularly concerned, although the improved insulating covering can be applied to other members of the joint, as will be hereinafter disclosed.

The insulation jacket 21 (see Fig. 6) is so formed that it may be wrapped around the conduit section 5 and covers substantially all portions thereof including the curved ends. It may be wired in place or secured in any other suitable manner. This insulation consists of a rather thick pad of asbestos or other long fibered cloth, or any other suitable insulating material might be used.

The rubber casing 22 which forms the subject-matter of this invention is shown detached in Fig. 2, and applied to the conduit in Figs. 1, 3 and 4. This casing is shaped to inclose the insulating jacket 21 and the entire conduit 5, except for the projecting outlets 10 and brackets 15. This casing 22 is split along its inner side as indicated at 23, in line with the central plane of the outlets 10 and brackets 15, so that the casing may be sprung apart and applied about the conduit member. Openings 24 are provided in the split portion 23 to accommodate the brackets 15. Outwardly projecting flanges 25 are formed along the edges of the split opening 23, these flanges being provided with mating perforations 26 through which metallic clips or binders 27 are passed. Each binder 27 (as best shown in Figs. 7 and 8) is of U-shape and formed with a short leg 35 which overlies the top of the flanges 25, and a long leg 36 split at 37 to form a pair of prongs 38. The leg 36 is passed through a pair of mating openings 26 in the flanges 25 and the prongs 38 are then bent up to lock the binder in place, as shown in Fig. 8.

At the ends of casing 22 are internally projecting annular collars 28 adapted to fit snugly about the laterally projecting outlets 10 of conduit 5. These collars 28 may be made of a suitable heat resisting material such as an asbestos composition, or phenolic, condensation product, moulded integral with the rubber casing or separately secured thereto in any suitable manner. The casing 22 is formed internally with a plurality of spaced longitudinally extending inwardly projecting ribs 29, and a second series of circumferentially extending ribs 30, these ribs being adapted to engage the insulating jacket 21 as shown in Fig. 5, and provide air pockets 31 about said jacket to add to the insulating efficiency of the covering. It will be noted that there are three effective layers of insulation, that is the inner asbestos jacket 21, the air pockets 31, and the outer rubber casing 22.

It will be apparent that in the process of coupling and uncoupling cars, and in the movements to which the flexible conduit is subjected while a train is in motion, these conduit members are subjected to frequent shocks, bumps or blows, and the rubber casing is particularly well adapted to withstand these blows without injury thereto, and at the same time serve as a protection for the insulating jacket 21 and the conduit 5.

It will be apparent that the same insulating principle may be applied to other sections of the flexible conduit. For example, on the lower conduit member 7 in Fig. 1, I have shown an insulating jacket 32 and an outer rubber casing 33 which are the same in all respects as the parts hereinabove described except for the changes in form and proportions necessary to adapt them to the conduit member 7.

I claim:

1. An insulating covering for a portion of a metallic conduit structure, comprising a rubber casing shaped to surround the conduit member substantially from end to end thereof, and split lengthwise to permit the casing to be sprung into place about the conduit, there being projecting flanges formed along the adjacent edges of the split portion, mating perforations being formed in these flanges, and binding members passed through these perforations.

2. An insulating covering for a portion of a metallic conduit structure, comprising a non-metallic casing shaped to surround the conduit member substantially from end to end thereof, and split lengthwise to permit the casing to be sprung into place about the conduit, there being projecting flanges formed along the adjacent edges of the split portion, mating perforations being formed in these flanges, and binding members passed through these perforations.

3. An insulating covering for a portion of a metallic conduit structure, comprising a rubber casing shaped to surround the conduit member substantially from end to end thereof, and split lengthwise to permit the casing to be sprung into place about the conduit, the casing being formed internally with a plurality of inwardly projecting spaced ribs providing air pockets therebetween when the casing is in place on the conduit, and means for securing together the edges of the split portion.

4. An insulating covering for a portion of a metallic conduit structure, comprising a rubber casing shaped to surround the conduit member substantially from end to end thereof, and split lengthwise to permit the casing to be sprung into place about the conduit, the casing being formed internally with a plurality of inwardly projecting spaced ribs providing air pockets therebetween when the casing is in place on the conduit, there being projecting flanges formed along the adjacent edges of the split portion, mating perforations being formed in these flanges, and binding members passed through the perforations.

5. An insulating covering for a portion of metallic conduit structure, comprising a rubber casing shaped to surround the conduit member substantially from end to end thereof, and split lengthwise to permit the casing to be sprung into place about the conduit, the casing being formed internally with a plurality of inwardly projecting spaced ribs, one series of the ribs running lengthwise of the casing and a second series running circumferentially of the casing and crossing the first series to provide a series of air pockets when the casing is in place on the conduit, and means for securing together the edges of the split portion.

6. An insulating covering for a portion of a metallic conduit structure, comprising a rubber casing shaped to surround the conduit member substantially from end to end thereof, and split lengthwise to permit the casing to be sprung into place about the conduit, the casing being formed internally with a plurality of inwardly projecting spaced ribs, one series of the ribs running lengthwise of the casing and a second series running circumferentially of the casing and crossing the first series to provide a series of air pockets when the casing is in place on the conduit, there being projecting flanges formed along the adjacent edges of the split portion and mating perforations being formed in the flanges, and binding members passed through the perforations.

7. An insulating covering for a portion of a metallic conduit structure, comprising a rubber casing shaped to surround the conduit member substantially from end to end thereof, and split lengthwise to permit the casing to be sprung into place about the conduit, the casing being formed internally with a plurality of inwardly projecting spaced ribs providing air pockets therebetween when the casing is in place on the conduit, and inwardly extending collars at the ends of the casing adapted to engage the conduit structure, and means for securing together the edges of the split portion.

8. In combination with a covering of fibrous insulating material adapted to be applied about a member of a metallic conduit structure, a rubber casing shaped to surround the member substantially from end to end thereof and split lengthwise along one side to permit the casing to be sprung into place about the conduit, the casing being formed internally with a plurality of crossed ribs projecting inwardly to engage the insulating material and provide air pockets between the insulation and the casing, and means for securing together the edges of the split portion.

9. In combination with a covering of fibrous insulating material adapted to be applied about a member of a metallic conduit structure, a non-metallic casing shaped to surround the member substantially from end to end thereof and split lengthwise along one side to permit the casing to be sprung into place about the conduit, the casing being formed internally with a plurality of crossed ribs projecting inwardly to engage the insulating material and provide air pockets between the insulation and the casing, and means for securing together the edges of the split portion.

10. The combination with a covering of fibrous insulating material shaped to enclose all except the end outlets of a tubular metallic conduit member formed with a straight portion curved to connect with end outlets opening at right angles to the straight portion and also having supporting brackets projecting from the straight portion in the same direction as the end outlets, of a rubber casing shaped to surround the member substantially from end to end thereof and split along its inner side in line with the centers of the outlets and the brackets to permit the casing to be sprung into place about the conduit the casing being formed internally with a plurality of crossed ribs which project inwardly to engage the insulating covering and provide air spaces between the insulation and the casing, the casing also being formed with inwardly projecting annular collars of heat resisting material at its ends which engage about the outlets, and means for securing together the edges of the split portion of the casing.

11. The combination with a covering of fibrous insulating material shaped to enclose all except the end outlets of a tubular metallic conduit member formed with a straight portion curved to connect with end outlets opening at right-angles to the straight portion and also having supporting brackets projecting from the straight portion in the same direction as the end outlets, of a rubber casing shaped to surround the member substantially from end to end thereof and split along its inner side in line with the centers of the outlets and the brackets to permit the casing to be sprung into place about the conduit, the casing being formed internally with a plurality of crossed ribs which project inwardly to engage the insulating covering and provide air spaces between the insulation and the casing, the casing also being formed with inwardly projecting annular collars of heat resisting material at its ends which engage about the outlets, there being projecting flanges formed along the edges of the split portion of the casing, the flanges having mating perforations therein, and metallic binders passed through the perforations.

12. In combination with a covering of fibrous insulating material shaped to be applied about a metallic conduit structure, a rubber casing shaped to surround the member substantially from end to end thereof and completely inclose the insulation, the casing being formed interiorly with a plurality of crossed ribs which engage the insulating material and provide air pockets between the insulation and the casing.

13. A rubber insulating casing for a portion of a flexible conduit structure, the casing being formed internally with a plurality of inwardly projecting crossed ribs adapted to engage the enclosed member and define separated air pockets between the casing and the member to which it is supplied.

WILLIAM W. KNIGHT.